United States Patent
Li et al.

(10) Patent No.: US 11,489,642 B2
(45) Date of Patent: Nov. 1, 2022

(54) WIRELESS TRANSMISSION USING DATA FLOW BEARERS

(71) Applicant: HUAWEI TECHNOLOGIES CO., LTD., Guangdong (CN)

(72) Inventors: Hong Li, Shanghai (CN); Feng Han, Shanghai (CN); Yinghao Jin, Shanghai (CN)

(73) Assignee: Huawei Technologies Co., Ltd., Guangdong (CN)

(*) Notice: Subject to any disclaimer, the term of this patent is extended or adjusted under 35 U.S.C. 154(b) by 0 days.

(21) Appl. No.: 16/527,860

(22) Filed: Jul. 31, 2019

(65) Prior Publication Data

US 2019/0356453 A1 Nov. 21, 2019

Related U.S. Application Data

(63) Continuation of application No. PCT/CN2018/075187, filed on Feb. 3, 2018.

(30) Foreign Application Priority Data

Feb. 3, 2017 (CN) .......................... 201710063714.0

(51) Int. Cl.
*H04L 5/00* (2006.01)
*H04W 72/04* (2009.01)
*H04W 72/08* (2009.01)

(52) U.S. Cl.
CPC ......... *H04L 5/0053* (2013.01); *H04W 72/042* (2013.01); *H04W 72/0413* (2013.01); *H04W 72/08* (2013.01)

(58) Field of Classification Search
CPC ............ H04L 5/0053; H04W 72/0413; H04W 72/042; H04W 72/08
See application file for complete search history.

(56) References Cited

U.S. PATENT DOCUMENTS

| | | | |
|---|---|---|---|
| 9,521,679 B2* | 12/2016 | Speicher | ........... H04W 28/0268 |
| 10,582,559 B2* | 3/2020 | Cho | ...................... H04W 76/22 |
| 10,652,947 B2* | 5/2020 | Pragada | ................. H04W 76/22 |
| 2008/0095037 A1 | 4/2008 | Chang et al. | |

(Continued)

FOREIGN PATENT DOCUMENTS

| | | |
|---|---|---|
| CN | 101932102 A | 12/2010 |
| CN | 101998296 A | 3/2011 |

(Continued)

OTHER PUBLICATIONS

U.S. Appl. No. 62/453,467, filed Feb. 1, 2017.*

(Continued)

*Primary Examiner* — Ian N Moore
*Assistant Examiner* — Rushil Parimal Sampat
(74) *Attorney, Agent, or Firm* — Fish & Richardson P.C.

(57) ABSTRACT

Embodiments of the present disclosure disclose a wireless communication method, user equipment, an access network device, and a network system. The method includes: receiving, by an access network device, a first downlink data flow sent by a core network device in a form of a flow; and sending, by the access network device, information to user equipment, where the information includes a mapping relationship between the first downlink data flow and a downlink bearer.

17 Claims, 8 Drawing Sheets

(56) References Cited

U.S. PATENT DOCUMENTS

| | | | |
|---|---|---|---|
| 2014/0029536 | A1 | 1/2014 | Tian et al. |
| 2016/0150439 | A1 | 5/2016 | Drevon et al. |
| 2019/0075482 | A1* | 3/2019 | Eriksson ............... H04W 76/27 |
| 2019/0150023 | A1* | 5/2019 | Cho ...................... H04W 28/02 370/235 |

FOREIGN PATENT DOCUMENTS

| | | |
|---|---|---|
| CN | 101998668 A | 3/2011 |
| CN | 102045853 A | 5/2011 |
| CN | 103546984 A | 1/2014 |
| EP | 3454601 A1 | 3/2019 |
| WO | 2009124492 A1 | 10/2009 |
| WO | 2013174422 A1 | 11/2013 |

OTHER PUBLICATIONS

U.S. Appl. No. 62/417,835, filed Nov. 4, 2016.*
Ericsson, "QoS framework for NR", 3GPP Draft, vol. RAN WG2, Meeting #96, R2-168657, XP051178213, Reno, Nevada, USA, Nov. 14-18, 2016, 6 pages.
Intel, "Email discussion convenor, summary of email discussion on QoS framework", SA WG2 Meeting #116,Agenda Item:6.10.2; Work Item / Release: FS_NextGen / Rel-14, S2-163427,(revision of S2-16xxxx), Vienna, AT, Jul. 11-15, 2016, 16 pages.
3GPP TR 23.799, vol. SA WG2, No. V14.0.0, Technical Specification Group Services and System Aspects, "Study on Architecture for Next Generation System (Release 14)", XP05129544816 Dec. 2016, 527 pages.
Huawei et al., "Flow, DRB, and QoS in RAN", 3GPP Draft, vol. RAN WG2, Meeting #95, R2-165024, XP051126664, Gothenburg, Sweden, Aug. 22-26, 2016, 6 pages.
Samsung, "QoS model for NR RAN", 3GPP Draft, vol. RAN WG2, Meeting #95bis, R2-166091, XP051150712, Kaohsiung, Taiwan, Oct. 10-14, 2016, 4 pages.
Extended European Search Report issued in European Application No. 18748448.0 dated Dec. 9, 2019, 11 pages.
PCT International Search Report and Written Opinion in International Application No. PCT/CN2018/075,187, dated Apr. 13, 2018, 17 pages (With English Translation).
Huawei, HiSilicon, "General Principles for Flow to DRB Mapping," 3GPP TSG-RAN2 Meeting #95bis, R2-166198, Kaohsiung, Oct. 10-14, 2016, 2 pages.
Office Action issued in Chinese Application No. 201710063714.0 dated Sep. 18, 2021, 18 pages (with English translation).
ZTE, "Discuss on the NR user plane protocol design," 3GPP TSG RAN WG2 Meeting #94, R2-163737, Nanjing, China, May 23-27, 2016, 7 pages.
3GPP TR 23.799 V1.2.1 (Nov. 2016), 3rd Generation Partnership Project; Technical Specification Group Services and System Aspects; Study on Architecture for Next Generation System(Release 14), 526 pages.
Office Action issued in Chinese Application No. 202011363040.4 dated Aug. 30, 2021, 16 pages (with English translation).
Office Action issued in Chinese Application No. 201710063714.0 dated Feb. 21, 2022, 4 pages.
ZTE, ZTE Microelectronics, "Further discussion on the uplink packets handling," 3GPP TSG-RAN WG2 NR Ad Hoc, R2-1700158, Spokane, USA, Jan. 17-19, 2017, 6 pages.

\* cited by examiner

WIRELESS TRANSMISSION USING DATA FLOW BEARERS

CROSS-REFERENCE TO RELATED APPLICATIONS

This application is a continuation of International Application No. PCT/CN2018/075187, filed on Feb. 3, 2018, which claims priority to Chinese Patent Application No. 201710063714.0, filed on Feb. 3, 2017. The disclosures of the aforementioned applications are incorporated herein by reference in their entireties.

TECHNICAL FIELD

Embodiments of the present invention relate to the field of wireless network communications, and in particular, to a wireless communication method, user equipment, an access network device, and a network system.

BACKGROUND

A system architecture working group 2 (SA2) of a third generation partnership project (Third Generation Partnership Project, 3GPP for short) organization defines a flow-based data transmission method. The transmission method specifically includes: When a downlink data packet arrives at a core network user plane (Core Network User Plane, CN UP for short) function entity, the CN UP function entity sends the data packet to an access network in a form of a flow. Then the access network (AN) sends the data packet to user equipment (UE) in the form of a flow.

Currently, a 3GPP access network working group defines an architecture different from a 3GPP system architecture group, and the 3GPP access network working group may retain a bearer (bearer) in an access network. In this architecture, the flow-based data transmission method cannot be simply reused to ensure data transmission in the access network.

SUMMARY

Embodiments of the present invention provide a wireless communication method, user equipment, an access network device, and a network system, to ensure data transmission in an access network.

According to a first aspect, an embodiment of the present invention provides a wireless communication method, including the following steps: receiving, by an access network device, a first downlink data flow sent by a core network device in a form of a flow; and sending, by the access network device, information to user equipment, where the information includes a mapping relationship between the first downlink data flow and a downlink bearer. When a bearer is retained in an access network, the access network device sends the mapping relationship between the first downlink data flow and the downlink bearer to the user equipment. A bearer that needs to be used when a data flow is sent can be determined based on the mapping relationship. This ensures data transmission in the access network.

In a possible design, the method further includes: sending, by the access network device, the first downlink data flow to the user equipment by using the downlink bearer; and receiving, by the access network device, a first uplink data flow sent by the user equipment by using an uplink bearer, where if the first uplink data flow is corresponding to the first downlink data flow, the uplink bearer is determined based on the downlink bearer. An uplink bearer used when a corresponding uplink data flow is transmitted can be determined based on a mapping relationship between a downlink data flow and a downlink bearer. This ensures quality of service (QoS). Further, directly receiving the mapping relationship can avoid adding an indication to each data packet, thereby reducing data transmission overheads over an air interface.

In a possible design, the mapping relationship between the first downlink data flow and the downlink bearer includes a correspondence between an identifier ID of the first downlink data flow and an ID of the downlink bearer. That the first uplink data flow is corresponding to the first downlink data flow includes: an ID of the first uplink data flow is the same as the ID of the first downlink data flow, or the first uplink data flow and the first downlink data flow belong to a same service flow, or the first uplink data flow and the first downlink data flow belong to a same session flow. That the uplink bearer is determined based on the downlink bearer includes: the downlink bearer and the uplink bearer are a same bearer, or a quality of service QoS attribute of the downlink bearer is the same as a QoS attribute of the uplink bearer. Practicing the foregoing solution can still ensure data transmission in the access network when an uplink data flow and a downlink data flow of a same service/session use different IDs.

In a possible design, the mapping relationship between the first downlink data flow and the downlink bearer includes a correspondence between a QoS attribute of the first downlink data flow and an ID of the downlink bearer. That the first uplink data flow is corresponding to the first downlink data flow includes: a QoS attribute of the first uplink data flow is the same as the QoS attribute of the first downlink data flow, or the first uplink data flow and the first downlink data flow belong to a same service flow, or the first uplink data flow and the first downlink data flow belong to a same session flow. That the uplink bearer is determined based on the downlink bearer includes: the uplink bearer and the downlink bearer are a same bearer, or a QoS attribute of the uplink bearer is the same as a QoS attribute of the downlink bearer.

In a possible design, the first downlink data flow received by the access network device includes a reflective quality of service identifier RQI, but the first downlink data flow sent by the access network device does not include the RQI. According to a feature that the core network device is usually connected to the access network device in a wired manner, a reflective quality of service identifier is used in a data flow to reduce signaling interaction, thereby shortening a transmission latency. However, the first downlink data flow sent by the access network device does not include the RQI. This can reduce air interface overheads and improve transmission efficiency.

According to a second aspect, an embodiment of the present invention provides a wireless communication method, including the following steps: receiving, by user equipment, information, where the information includes a mapping relationship between a first downlink data flow and a downlink bearer; and receiving, by the user equipment, the first downlink data flow by using the downlink bearer.

In a possible design, the method further includes: sending, by the user equipment, a first uplink data flow by using an uplink bearer, where if the first uplink data flow is corresponding to the first downlink data flow, the uplink bearer is determined based on the downlink bearer.

In a possible design, the mapping relationship between the first downlink data flow and the downlink bearer includes a correspondence between an identifier ID of the first downlink data flow and an ID of the downlink bearer. That the first uplink data flow is corresponding to the first downlink data flow includes: an ID of the first uplink data flow is the same as the ID of the first downlink data flow, or the first uplink data flow and the first downlink data flow belong to a same service flow, or the first uplink data flow and the first downlink data flow belong to a same session flow. That the uplink bearer is determined based on the downlink bearer includes: the downlink bearer and the uplink bearer are a same bearer, or a quality of service QoS attribute of the downlink bearer is the same as a QoS attribute of the uplink bearer.

In a possible design, the mapping relationship between the first downlink data flow and the downlink bearer includes a correspondence between a QoS attribute of the first downlink data flow and an ID of the downlink bearer. That the first uplink data flow is corresponding to the first downlink data flow includes: a QoS attribute of the first uplink data flow is the same as the QoS attribute of the first downlink data flow, or the first uplink data flow and the first downlink data flow belong to a same service flow, or the first uplink data flow and the first downlink data flow belong to a same session flow. That the uplink bearer is determined based on the downlink bearer includes: the uplink bearer and the downlink bearer are a same bearer, or a QoS attribute of the uplink bearer is the same as a QoS attribute of the downlink bearer.

According to a third aspect, an embodiment of the present invention provides a network device. The network device includes a receiving unit and a sending unit. The receiving unit is configured to receive a first downlink data flow sent by a core network device in a form of a flow. The sending unit is configured to send information to user equipment, where the information includes a mapping relationship between the first downlink data flow and a downlink bearer.

In a possible design, the sending unit is further configured to send the first downlink data flow to the user equipment by using the downlink bearer; and the receiving unit is further configured to receive a first uplink data flow sent by the user equipment by using an uplink bearer, where if the first uplink data flow is corresponding to the first downlink data flow, the uplink bearer is determined based on the downlink bearer.

In a possible design, the mapping relationship between the first downlink data flow and the downlink bearer includes a correspondence between an identifier ID of the first downlink data flow and an ID of the downlink bearer. That the first uplink data flow is corresponding to the first downlink data flow includes: an ID of the first uplink data flow is the same as the ID of the first downlink data flow, or the first uplink data flow and the first downlink data flow belong to a same service flow, or the first uplink data flow and the first downlink data flow belong to a same session flow. That the uplink bearer is determined based on the downlink bearer includes: the downlink bearer and the uplink bearer are a same bearer, or a quality of service QoS attribute of the downlink bearer is the same as a QoS attribute of the uplink bearer.

In a possible design, the mapping relationship between the first downlink data flow and the downlink bearer includes a correspondence between a QoS attribute of the first downlink data flow and an ID of the downlink bearer. That the first uplink data flow is corresponding to the first downlink data flow includes: a QoS attribute of the first uplink data flow is the same as the QoS attribute of the first downlink data flow, or the first uplink data flow and the first downlink data flow belong to a same service flow, or the first uplink data flow and the first downlink data flow belong to a same session flow. That the uplink bearer is determined based on the downlink bearer includes: the uplink bearer and the downlink bearer are a same bearer, or a QoS attribute of the uplink bearer is the same as a QoS attribute of the downlink bearer.

In a possible design, the first downlink data flow received by the receiving unit includes a reflective quality of service identifier RQI, but the first downlink data flow sent by the sending unit does not include the RQI.

According to a fourth aspect, an embodiment of the present invention provides user equipment. The user equipment includes a receiving unit. The receiving unit is configured to receive information, where the information includes a mapping relationship between a first downlink data flow and a downlink bearer. The receiving unit is further configured to receive the first downlink data flow by using the downlink bearer.

In a possible design, the user equipment further includes a sending unit. The sending unit is configured to send a first uplink data flow by using an uplink bearer, where if the first uplink data flow is corresponding to the first downlink data flow, the uplink bearer is determined based on the downlink bearer.

In a possible design, the mapping relationship between the first downlink data flow and the downlink bearer includes a correspondence between an identifier ID of the first downlink data flow and an ID of the downlink bearer. That the first uplink data flow is corresponding to the first downlink data flow includes: an ID of the first uplink data flow is the same as the ID of the first downlink data flow, or the first uplink data flow and the first downlink data flow belong to a same service flow, or the first uplink data flow and the first downlink data flow belong to a same session flow. That the uplink bearer is determined based on the downlink bearer includes: the downlink bearer and the uplink bearer are a same bearer, or a quality of service QoS attribute of the downlink bearer is the same as a QoS attribute of the uplink bearer.

In a possible design, the mapping relationship between the first downlink data flow and the downlink bearer includes a correspondence between a QoS attribute of the first downlink data flow and an ID of the downlink bearer. That the first uplink data flow is corresponding to the first downlink data flow includes: a QoS attribute of the first uplink data flow is the same as the QoS attribute of the first downlink data flow, or the first uplink data flow and the first downlink data flow belong to a same service flow, or the first uplink data flow and the first downlink data flow belong to a same session flow. That the uplink bearer is determined based on the downlink bearer includes: the uplink bearer and the downlink bearer are a same bearer, or a QoS attribute of the uplink bearer is the same as a QoS attribute of the downlink bearer.

According to a fifth aspect, an embodiment of the present invention provides a wireless communication method, including the following steps: receiving, by user equipment, information, where the information includes a mapping rule between a data flow and a bearer; and sending, by the user equipment, a first uplink data flow by using an uplink bearer, where the uplink bearer is determined based on the mapping rule. When a bearer is retained in an access network, the user equipment receives the mapping rule between a data flow and a bearer, and can determine, based on the rule, a bearer that needs to be used when a data flow is sent. This ensures data transmission in the access network. Further, directly receiving the mapping rule between a data flow and a bearer can avoid adding an indication to each data packet, thereby reducing data transmission overheads over an air interface.

In a possible design, the method further includes: receiving, by the user equipment, a first downlink data flow by using a downlink bearer. The mapping rule between a data flow and a bearer includes a mapping relationship between the first downlink data flow and the downlink bearer. That the uplink bearer is determined based on the mapping rule includes: if the first uplink data flow is corresponding to the first downlink data flow, the uplink bearer is determined based on the downlink bearer. An uplink bearer used when a corresponding uplink data flow is transmitted can be determined based on a mapping relationship between a downlink data flow and a bearer. This ensures data transmission in the access network. Further, when uplink data is transmitted, quality of service (QoS) can be ensured by using a bearer.

In a possible design, the mapping relationship between the first downlink data flow and the downlink bearer includes a correspondence between an identifier ID of the first downlink data flow and an ID of the downlink bearer. That the first uplink data flow is corresponding to the first downlink data flow includes: an ID of the first uplink data flow is the same as the ID of the first downlink data flow, or the first uplink data flow and the first downlink data flow belong to a same service flow, or the first uplink data flow and the first downlink data flow belong to a same session flow. That the uplink bearer is determined based on the downlink bearer includes: the downlink bearer and the uplink bearer are a same bearer, or a quality of service QoS attribute of the downlink bearer is the same as a QoS attribute of the uplink bearer.

In a possible design, the mapping relationship between the first downlink data flow and the downlink bearer includes a correspondence between a QoS attribute of the first downlink data flow and an ID of the downlink bearer. That the first uplink data flow is corresponding to the first downlink data flow includes: a QoS attribute of the first uplink data flow is the same as the QoS attribute of the first downlink data flow, or the first uplink data flow and the first downlink data flow belong to a same service flow, or the first uplink data flow and the first downlink data flow belong to a same session flow. That the uplink bearer is determined based on the downlink bearer includes: the uplink bearer and the downlink bearer are a same bearer, or a QoS attribute of the uplink bearer is the same as a QoS attribute of the downlink bearer.

In a possible design, the method further includes: receiving, by the user equipment, a second downlink data flow by using the downlink bearer; and sending, by the user equipment, a second uplink data flow by using the uplink bearer, where the second uplink data flow is corresponding to the second downlink data flow. The mapping rule between a data flow and a bearer further includes a mapping relationship between the second downlink data flow and the downlink bearer.

In a possible design, the method further includes: when transmitted between a core network device and an access network device, the first downlink data flow includes a reflective quality of service identifier. According to a feature that the core network device is usually connected to the access network device in a wired manner, a reflective quality of service identifier is used in a data flow to reduce signaling interaction, thereby shortening a transmission latency.

In a possible design, the receiving, by user equipment, information includes: receiving, by the user equipment, the information from an access network device by using RRC signaling.

According to a sixth aspect, an embodiment of the present invention provides a wireless communication method, including the following steps: sending, by an access network device, information, where the information includes a mapping rule between a data flow and a bearer; and receiving, by the access network device, a first uplink data flow sent by user equipment by using an uplink bearer, where the uplink bearer is determined based on the mapping rule.

In a possible design, the method further includes: sending, by the access network device, a first downlink data flow to the user equipment by using a downlink bearer. The mapping rule between a data flow and a bearer includes a mapping relationship between the first downlink data flow and the downlink bearer. That the uplink bearer is determined based on the mapping rule includes: if the first uplink data flow is corresponding to the first downlink data flow, the uplink bearer is determined based on the downlink bearer.

In a possible design, the mapping relationship between the first downlink data flow and the downlink bearer includes a correspondence between an identifier ID of the first downlink data flow and an ID of the downlink bearer. That the first uplink data flow is corresponding to the first downlink data flow includes: an ID of the first uplink data flow is the same as the ID of the first downlink data flow, or the first uplink data flow and the first downlink data flow belong to a same service flow, or the first uplink data flow and the first downlink data flow belong to a same session flow. That the uplink bearer is determined based on the downlink bearer includes: the downlink bearer and the uplink bearer are a same bearer, or a quality of service QoS attribute of the downlink bearer is the same as a QoS attribute of the uplink bearer.

In a possible design, the mapping relationship between the first downlink data flow and the downlink bearer includes a correspondence between a QoS attribute of the first downlink data flow and an ID of the downlink bearer. That the first uplink data flow is corresponding to the first downlink data flow includes: a QoS attribute of the first uplink data flow is the same as the QoS attribute of the first downlink data flow, or the first uplink data flow and the first downlink data flow belong to a same service flow, or the first uplink data flow and the first downlink data flow belong to a same session flow. That the uplink bearer is determined based on the downlink bearer includes: the uplink bearer and the downlink bearer are a same bearer, or a QoS attribute of the uplink bearer is the same as a QoS attribute of the downlink bearer.

In a possible design, the method further includes: sending, by the access network device, a second downlink data flow to the user equipment by using the downlink bearer; and receiving, by the access network device, a second uplink data flow by using the uplink bearer, where the second uplink data flow is corresponding to the second downlink data flow. The mapping rule between a data flow and a bearer further includes a mapping relationship between the second downlink data flow and the downlink bearer.

In a possible design, the method further includes: receiving, by the access network device, the second downlink data flow, where the second downlink data flow includes an RQI.

In a possible design, the method further includes: receiving, by the access network device, the first downlink data flow, where the first downlink data flow includes a reflective quality of service identifier RQI.

In a possible design, the sending, by an access network device, information includes: sending, by the access network device, the information to the user equipment by using RRC signaling.

According to a seventh aspect, an embodiment of the present invention provides a wireless communication method, including the following steps: receiving, by user equipment, a downlink data flow from a downlink bearer, where the downlink data flow includes a reflective quality of service identifier RQI; and sending, by the user equipment, an uplink data flow by using an uplink bearer, where the uplink data flow is corresponding to the downlink data flow, and the uplink bearer is determined based on the downlink bearer. The user equipment may obtain a mapping relationship between a data flow and a bearer based on the reflective quality of service identifier RQI. This can reduce signaling interaction. The method is applicable to some services featuring data of infrequent small packets.

In a possible design, that the uplink bearer is determined based on the downlink bearer includes: the uplink bearer and the downlink bearer are a same bearer, or a quality of service QoS attribute of the uplink bearer is the same as a QoS attribute of the downlink bearer.

In a possible design, that the uplink data flow is corresponding to the downlink data flow includes: an ID of the uplink data flow is the same as an ID of the downlink data flow, or the uplink data flow and the downlink data flow belong to a same service flow, or the uplink data flow and the downlink data flow belong to a same session flow.

According to an eighth aspect, an embodiment of the present invention provides a wireless communication method, including the following steps: sending, by an access network device, a downlink data flow by using a downlink bearer, where the downlink data flow includes a reflective quality of service identifier RQI; and receiving, by the access network device, an uplink data flow by using an uplink bearer, where the uplink data flow is corresponding to the downlink data flow, and the uplink bearer is determined based on the downlink bearer.

In a possible design, that the uplink bearer is determined based on the downlink bearer includes: the uplink bearer and the downlink bearer are a same bearer, or a quality of service QoS attribute of the uplink bearer is the same as the QoS attribute of the downlink bearer.

In a possible design, that the uplink data flow is corresponding to the downlink data flow includes: an ID of the uplink data flow is the same as an ID of the downlink data flow, or the uplink data flow and the downlink data flow belong to a same service flow, or the uplink data flow and the downlink data flow belong to a same session flow.

In a possible design, the method further includes: receiving, by the access network device in a flow manner, the downlink data flow sent by a core network device; and sending, by the access network device in the flow manner, the uplink data flow to the core network device.

According to another aspect, an embodiment of the present invention provides a network device, including a processor, a memory, and a transceiver. The processor is coupled to the memory and the transceiver. The memory is configured to store a program instruction. The processor executes the program instruction stored in the memory, so that the network device performs the method according to the first aspect, the sixth aspect, or the eighth aspect.

According to another aspect, an embodiment of the present invention provides user equipment, including a processor, a memory, and a transceiver. The processor is coupled to the memory and the transceiver. The memory is configured to store a program instruction. The processor executes the program instruction stored in the memory, so that the user equipment performs the method according to the second aspect, the fifth aspect, or the seventh aspect.

According to another aspect, an embodiment of the present invention provides user equipment. The user equipment includes units, for example, a sending unit and a receiving unit, used to implement the method according to the fifth aspect. Alternatively, the user equipment includes units used to implement the method according to the seventh aspect.

According to another aspect, an embodiment of the present invention provides an access network device. The access network device includes units, for example, a sending unit and a receiving unit, used to implement the method according to the sixth aspect. Alternatively, the user equipment includes units used to implement the method according to the eighth aspect.

According to another aspect, an embodiment of the present invention provides a communications system, and the system includes the user equipment and the access network device according to the foregoing aspects.

According to another aspect, an embodiment of the present invention provides a computer program product including an instruction. When the instruction runs on a computer, the computer performs the methods according to the foregoing aspects.

According to another aspect, an embodiment of the present invention provides a computer storage medium including an instruction. When the instruction runs on a computer, the computer performs the methods according to the foregoing aspects.

DESCRIPTION OF EMBODIMENTS

Figure 1:
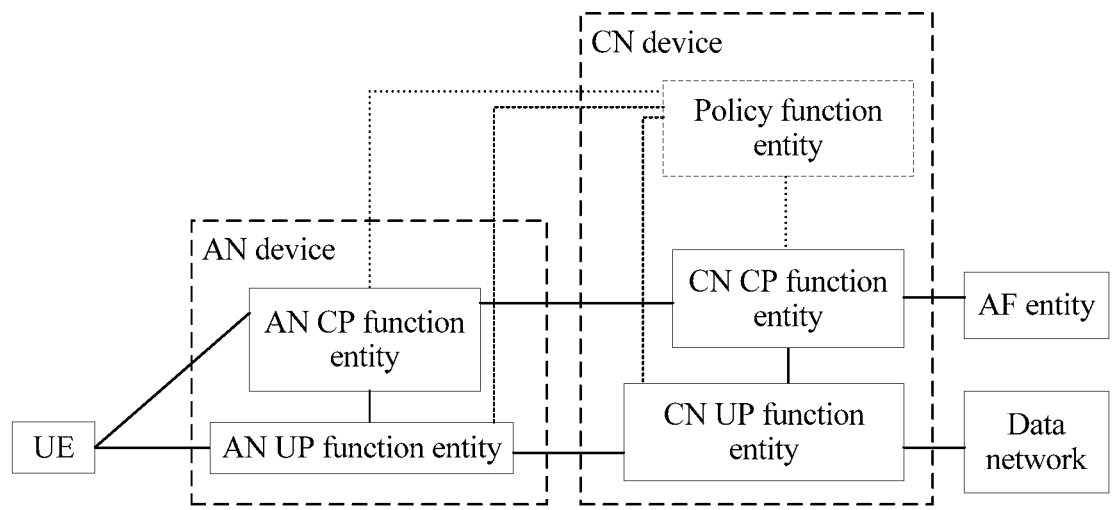
FIG. 1 is a schematic diagram of a wireless communications system according to an embodiment of this patent application.

In the specification, claims, and accompanying drawings of this patent application, the terms "first", "second", and so on are intended to distinguish between similar objects, but do not necessarily indicate a specific order or sequence. It should be understood that the terms used in such a way are interchangeable in appropriate circumstances so that the embodiments of the present invention described in this specification can be implemented in orders other than the orders illustrated or described herein. Moreover, the terms "include", "comprise", and any other variants thereof mean to cover the non-exclusive inclusion, for example, a process, method, system, product, or device that includes a list of steps or units is not necessarily limited to those steps or units expressly listed, but may include other steps or units not expressly listed or inherent to such a process, method, product, or device.

The terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists.

In this specification, the term "connection" may be a direct connection or an indirect connection. A "function entity" is an entity that implements a function and includes a corresponding hardware structure and/or software module for performing the function. In this specification, the term "sending" may be direct sending or indirect sending performed by using another network element. In this specification, the term "receiving" may be direct receiving or indirect receiving performed by using another network element.

In this specification, the term "bearer" is a data transmission channel that is corresponding to QoS and that is set up by a network to implement differentiated data transmission. A bearer may be implemented by using a data tunnel, for example, a logical data transmission channel that is set up between a source node and a destination node for data transmission and that is based on a GPRS tunneling protocol (GPRS Tunneling Protocol, GTP for short). All data flows on one bearer are not distinguished in terms of QoS control and are corresponding to same data packet forwarding treatment, and data transmission of the data flows is performed according to a transmission protocol corresponding to a transmission channel.

In this specification, the term "data flow" is a data flow that is related to a service and that is generated by UE or a network. A QoS flow may be a form of the data flow. A service flow may also be a form of the data flow.

To transfer data to a peer end, the data needs to be transmitted by using a network. The network converts higher-layer data into a form that is suitable for transmission in the network. A flow-based transmission mode means that the network processes data packets in a same flow by using same data packet forwarding treatment (packet forwarding treatment) and a same QoS rule. The flow-based transmission mode may include sending in a form of a flow or receiving in a form of a flow. This is different from a bearer-based QoS control manner in which different data flows may be mapped to a same bearer and QoS differentiation is not performed on data flows on the same bearer. A manner of mapping between a data flow and a bearer may be a 1:1 mapping manner or an N:1 mapping manner. The mapping manner may be further related to a QoS attribute of the data flow. For example, the 1:1 mapping manner is used for a guaranteed bit rate (guaranteed bit rate, GBR for short) data flow, and the N:1 mapping manner may be used for a non-guaranteed bit rate (non-guaranteed bit rate, non-GBR for short) data flow.

A finer QoS control and differentiation granularity may be achieved by performing transmission in a data flow manner. One or more data flows may be mapped to one bearer, and signaling overheads may be reduced by performing transmission in a bearer-based manner. Bearers that need to be set up by the network and corresponding signaling overheads decrease with increasing data flows mapped to one bearer.

In this specification, the term "IP flow" is higher-layer (above a MAC layer) data that is related to a service and that is generated by UE or an external data network (DN). The data may be based on an IP protocol or a non-IP (non-IP) protocol. To implement differentiated QoS services, the network maps an IP flow to a QoS flow based on QoS requirements corresponding to different IP flows. Different QoS flows are corresponding to different data packet treatment (data packet treatment).

In this specification, the term "QoS rule" is an information set specified based on an operator policy, an application requirement, and a QoS parameter, and is used to detect a data flow, define a QoS parameter related to the data flow, and determine a data flow transmission mode. The data flow transmission mode may be performing transmission in a flow manner or performing transmission by using a bearer. Performing transmission in a flow manner may be transmitting a data packet in a data flow in the flow manner. Performing transmission by using a bearer may be mapping one or more data flows to one bearer for transmission.

The QoS rule may include QoS requirement information and/or a data flow transmission mode, for example, performing transmission by using a bearer or performing transmission in a flow manner. The QoS requirement information may include a data rate, a transmission latency, and the like. The QoS rule may further include a mapping rule between a bearer and a data flow.

In this specification, the term "mapping" is mapping one or more data flows with same or similar QoS to one bearer, and each bearer is corresponding to a set of QoS parameters. The QoS parameters may include a QoS level, a maximum bit rate (Maximum Bit Rate, MBR for short), an allocation and retention priority (Allocation and Retention Priority, ARP for short), and the like of a service, and is used to identify a manner in which a network processes data on the bearer. Same data forwarding treatment is performed on data on one bearer. A core network user plane (Core Network Control Plane, AN CP for short) function entity and a UE user plane function entity may map a plurality of data flows with different QoS to one or more bearers. The CN UP function entity, an AN CP function entity, and the UE user plane function entity may perform flow demapping operations.

In this specification, the term "demapping" is an inverse process of "mapping". To be specific, data on one bearer is demapped and restored to different data flows. It should be noted that both a mapping process and a demapping process are optional operations, and each user plane function entity determines, based on an obtained QoS rule, whether to perform a corresponding operation.

In this specification, the term "flow priority indicator (Flow Priority Indicator, FPI for short)" indicates a processing priority for each flow when data corresponding to the flow is processed. For example, the FPI may be corresponding to a priority of scheduling a flow by a network when congestion occurs. The FPI may be an identifier similar to a QCI.

In this specification, the term reflective QoS (Reflective QoS) indicates that uplink data transmission QoS is reflection of downlink data transmission QoS. A basic idea of reflective QoS is to determine uplink data transmission QoS information based on downlink data transmission QoS information.

In this specification, the term "reflective QoS indication" (Reflective QoS Indication, RQI) is indication information used to indicate whether data transmission is performed in a reflective QoS manner. If downlink data includes an RQI, the RQI may be used to indicate that a QoS control manner consistent with that for downlink data transmission is used for corresponding uplink data transmission. The RQI may be applied to a single data flow or an aggregation of a plurality of data flows.

The technical solutions in the embodiments of the present invention are described below in detail by using specific embodiments. The following several specific embodiments may be combined with each other, and a same or similar concept or process may not be described repeatedly in some embodiments.

FIG. 1 is a schematic diagram of a wireless communications system according to an embodiment of the present invention. The wireless communications system includes UE, an access network (Access Network, AN for short) device, and a core network (Core Network, CN for short) device. The UE is connected to the AN device over an air interface. The AN device and the CN device may be connected in a wired manner or a wireless manner. The UE communicates with the CN device by using the AN device.

The UE in this embodiment of this application may be a terminal device, an access terminal, a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a session initiation protocol (Session Initiation Protocol, "SIP" for short) phone, a wireless local loop (Wireless Local Loop, "WLL" for short) station, a personal digital assistant (Personal Digital Assistant, "PDA" for short), a handheld device having a wireless communication function, a computing device, another processing device connected to a wireless modem, an in-vehicle device, a wearable device, a terminal device in a future 5G network, or a terminal device in a future evolved public land mobile network (Public Land Mobile Network, "PLMN" for short).

The AN device in this embodiment of this application may be a device that is configured to communicate with the terminal device. The AN device may be a base transceiver station (Base Transceiver Station, "BTS" for short) in a GSM or CDMA, or may be a NodeB (NodeB, "NB" for short) in a WCDMA system, or may be an evolved NodeB (Evolutional NodeB, "eNB or eNodeB" for short) in an LTE system, or may be a radio controller in a cloud radio access network (Cloud Radio Access Network, "CRAN" for short) scenario. Alternatively, the AN device may be a relay station, an access point, an in-vehicle device, a wearable device, or an AN device in the future 5G network, or may be an AN device in a future evolved network, or the like. The AN device may be alternatively a next-generation NodeB (Next-generation NodeB, gNB for short), a transmission and reception point (Transmit and Receive Point, TRP for short), a central unit (Central Unit, CU for short) device, a distributed unit (Distributed Unit, DU for short) device, or the like.

In the embodiment shown in FIG. 1, the AN device includes an access network control plane (Access Network Control Plane, AN CP for short) function entity and an access network user plane (Access Network User Plane, AN UP for short) function entity. The AN CP function entity is connected to the AN UP function entity. The AN CP function entity has a QoS control function, and can control QoS processing of the AN UP function entity. Optionally, the AN CP function entity can send a QoS rule to the AN UP function entity. The AN UP function entity transmits data based on the received QoS rule.

The CN device may be a gateway, a router, a data center, a server, a network management device, or the like. In the embodiment shown in FIG. 1, the CN device includes a core network control plane (Core Network Control Plane, CN CP for short) function entity and a core network user plane (Core Network User Plane, CN UP for short) function entity. The CN CP function entity is connected to the CN UP function entity. The CN CP function entity has a QoS control function, and can control QoS processing of the CN UP function entity. The CN CP function entity can send the QoS rule to the CN UP function entity. The CN UP function entity transmits data based on the received QoS rule.

Optionally, the CN device may further include a policy function entity. The policy function entity is configured to: specify a corresponding QoS control policy based on subscription information of a subscriber and an operator policy, and perform QoS authorization on a service based on a received QoS authorization request, or the like. The policy function entity may be connected to the AN CP function entity and the CN CP function entity. The policy function entity is configured to send QoS authorization information to the AN CP function entity and the CN CP function entity. The policy function entity may be further connected to the AN UP function entity and the CN UP function entity, and is configured to send QoS authorization information to the AN UP function entity and the CN UP function entity.

In the embodiment shown in FIG. 1, the AN device and the CN device have QoS control functions that are logically independent and that are respectively implemented by using the AN CP function entity and the CN CP function entity. The AN CP function entity and the CN CP function entity have similar QoS control functions, but have different control ranges. The CN CP function entity mainly controls QoS processing of the CN UP function entity, and the AN CP function entity mainly controls QoS processing of the AN UP function entity. A core network and an access network have different resources. The core network and the access network can implement respective flexible QoS management functions by using different QoS control methods based on respective resource usage.

In this embodiment, the AN device has a QoS management function, and can manage and control data transmission on an AN user plane. This improves QoS management flexibility of a service in a wireless communications network, and provides a possibility of independent evolution of a CN QoS framework and an AN QoS framework.

The wireless communications system may further communicate with an application function (Application Function, AF for short) entity and a data network (Data Network, DN for short). The AF entity can provide a data flow service with a specific QoS requirement, and is similar to an application server. The AF entity may be deployed by a network operator, or may be deployed by a third party. The data network may provide a specified type of data service, is usually an external network, and is similar to a packet data network (Packet Data Network, PDN for short). Types of data networks include but are not limited to the Internet (English: Internet) and an IP multimedia subsystem (English: IP Multimedia Subsystem, IMS for short).

Figure 2:
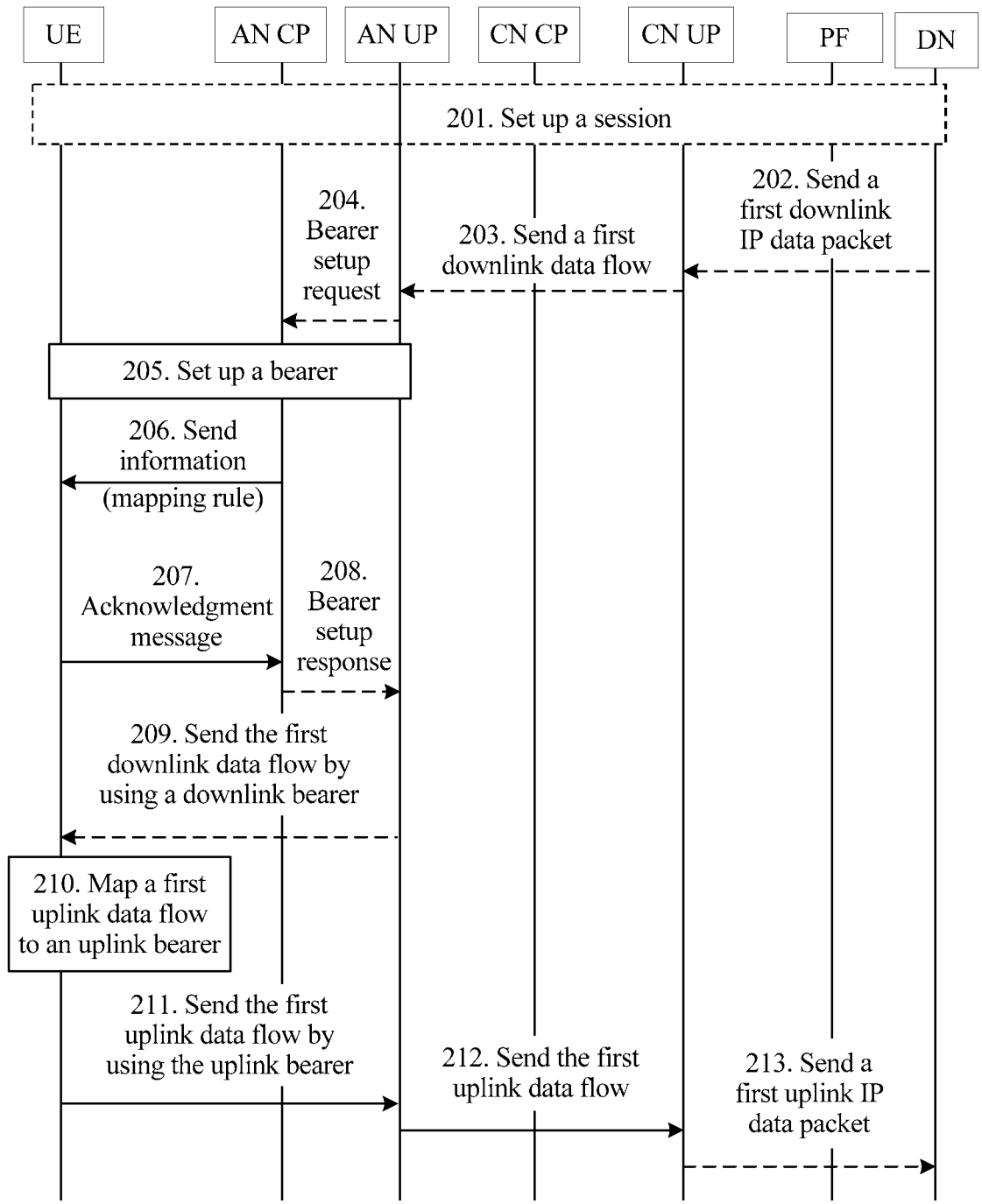
FIG. 2 is a schematic interaction diagram of a communication method according to another embodiment of this patent application.

FIG. 2 is a schematic interaction diagram of a communication method according to an embodiment of this patent application. As shown in FIG. 2, the method includes the following steps.

201. After a user successfully accesses a network, UE sets up a session (session) between the UE and a data network by using a wireless communications system. In this process, the UE obtains an identifier, for example, an IP address, used to communicate with the data network. The session may be a protocol data unit (Protocol Data Unit, PDU) session. A PF generates a NAS layer filter, and the filter is used to indicate how to map an IP flow to a data flow. The PF sends the NAS layer filter to a CN CP function entity and a CN UP function entity. The CN CP function entity forwards the NAS layer filter to the UE via an AN CP function entity by using NAS signaling.

202. The data network sends a first downlink IP data packet to the CN UP function entity. The CN UP function entity receives the first downlink IP data packet. An IP data packet may be transmitted in a form of an IP flow. Specifically, the first downlink IP data packet may be a first downlink IP flow.

203. The CN UP function entity processes the first downlink IP flow, and maps the first downlink IP flow to a first downlink data flow. The CN UP function entity sends the first downlink data flow to an AN UP function entity. The AN UP function entity receives the first downlink data flow.

The first downlink data flow is corresponding to one FPI denoted as FPI_1. Optionally, the CN UP function entity may further allocate a flow identifier (ID) denoted as Flow ID_1 to the first downlink data flow. The CN UP function entity adds data flow information to a data packet header of the first downlink data flow. The data flow information may include the FPI and the flow identifier. Optionally, the CN UP function entity may further add an RQI to the data packet header of the first downlink data flow. In this way, the AN UP function entity can know that a corresponding uplink data flow may be transmitted based on a QoS attribute of the first downlink data flow.

The first downlink IP flow may be mapped to the first downlink data flow in a template-based filtering manner. For example, a parameter group is defined, and a value or a value range is set for each parameter in the group. When a related parameter of a data packet is the same as a preset value or falls within a preset value range, the data packet may be mapped to a corresponding data flow. In an example, the parameter group may be an IP quintuplet. The IP quintuplet includes a destination IP address, a source IP address, a destination port number, a source port number, and a protocol type.

204. After receiving the first downlink data flow, the AN UP function entity checks whether there is a bearer available for mapping. For example, whether there is a bearer available for mapping may be checked based on the QoS attribute of the first downlink data flow. If there is no bearer available for mapping, the AN UP function entity initiates a bearer setup request to the AN CP function entity, and the AN CP function entity receives the bearer setup request. The bearer setup request includes QoS information. For example, the bearer setup request may include QoS information of the first downlink data flow, such as an FPI. The bearer setup request may further include the flow ID of the first downlink data flow.

205. The AN CP function entity initiates setup of a bearer between the UE and the AN UP function entity. The AN CP function entity initiates the setup of the bearer between the UE and the AN UP based on the QoS information included in the bearer setup request. In this embodiment, for ease of description, the bearer set up in step 205 may be referred to as a downlink bearer.

In a process of setting up the downlink bearer, the AN CP function entity generates a bearer identifier. The identifier may be used to identify the downlink bearer. The AN CP function entity configures a QoS parameter, such as a QoS level, for the bearer.

The foregoing describes bearer setup triggering based on a downlink data flow. It should be noted that the bearer may be set up in advance, or the bearer may be a default bearer. The downlink bearer may be unidirectional. Alternatively, the downlink bearer may be bidirectional. To be specific, the downlink bearer may also be used for uplink data transmission. In other words, the downlink bearer is also an uplink bearer.

206. After the bearer is set up, the AN CP function entity sends information to the UE, where the information includes a mapping rule between a data flow and a bearer, for example, a mapping relationship between the first downlink data flow and the downlink bearer. The message may be sent in a form of radio resource control (Radio Resource Control, RRC) signaling. The UE receives the information. The mapping rule between a data flow and a bearer is used by the UE to determine mapping from the data flow to the bearer when the UE sends uplink data.

The mapping rule between a data flow and a bearer may be in a plurality of forms. For example, the mapping relationship between the first downlink data flow and the downlink bearer may specifically include a correspondence between an identifier ID of the first downlink data flow and an ID of the downlink bearer. Alternatively, the mapping relationship between the first downlink data flow and the downlink bearer includes a correspondence between a quality of service QoS attribute of the first downlink data flow and an ID of the downlink bearer. The mapping rule between a data flow and a bearer may further directly include a mapping relationship between an uplink data flow and an uplink bearer, and may specifically include a correspondence between an identifier ID of the uplink data flow and an ID of the uplink bearer or a correspondence between a quality of service QoS attribute of the uplink data flow and an ID of the uplink bearer.

207. The UE sends an acknowledgment message to the AN CP function entity, to confirm that the UE has received the message including the mapping rule between a data flow and a bearer. The AN CP function entity receives the acknowledgment message.

208. The AN CP function entity sends a bearer setup response to the AN UP function entity, and the AN UP function entity receives the bearer setup response. The bearer setup response includes information about the bearer. The information about the bearer includes an identifier of the bearer and QoS information of the bearer. The QoS information of the bearer includes a QoS level supported by the bearer, for example, a QCI.

It should be noted that step 208 is optional. For example, step 208 may be alternatively omitted when step 205 is not triggered by step 204.

209. The AN UP function entity maps the first downlink data flow to the downlink bearer, and sends the first downlink data flow to the UE by using the downlink bearer. The UE receives the first downlink data flow. The first downlink data flow transmitted on the downlink bearer does not need to include the RQI or the FPI. Optionally, the first downlink data flow transmitted on the downlink bearer may include the ID of the data flow. In this case, if two or more data flows are transmitted on the downlink bearer, the different data flows can be correctly distinguished.

It should be noted that step 209 is also optional. For example, when step 202 and step 203 are not performed, step 209 does not need to be performed.

210. When the UE needs to send a first uplink data flow, the UE maps the first uplink data flow to an uplink bearer. The uplink bearer is determined based on the mapping rule.

The mapping rule between a data flow and a bearer includes the mapping relationship between the first downlink data flow and the downlink bearer. That the uplink bearer is determined based on the mapping rule includes: If the first uplink data flow is corresponding to the first downlink data flow, the uplink bearer is determined based on the downlink bearer.

In one case, the mapping relationship between the first downlink data flow and the downlink bearer includes the correspondence between the identifier ID of the first downlink data flow and the ID of the downlink bearer. That the first uplink data flow is corresponding to the first downlink data flow includes: An ID of the first uplink data flow is the same as the ID of the first downlink data flow, or the first uplink data flow and the first downlink data flow belong to a same service flow, or the first uplink data flow and the first downlink data flow belong to a same session flow.

That the uplink bearer is determined based on the downlink bearer includes: The downlink bearer and the uplink bearer are a same bearer, or a quality of service QoS attribute of the downlink bearer is the same as a QoS attribute of the uplink bearer.

In another case, the mapping relationship between the first downlink data flow and the downlink bearer includes the correspondence between the quality of service QoS attribute of the first downlink data flow and the ID of the downlink bearer. That the first uplink data flow is corresponding to the first downlink data flow includes: A QoS attribute of the first uplink data flow is the same as the QoS attribute of the first downlink data flow, or the first uplink data flow and the first downlink data flow belong to a same service flow, or the first uplink data flow and the first downlink data flow belong to a same session flow. That the uplink bearer is determined based on the downlink bearer includes: The uplink bearer and the downlink bearer are a same bearer, or a QoS attribute of the uplink bearer is the same as a QoS attribute of the downlink bearer.

It should be noted that the uplink bearer and the downlink bearer may be the same or different. If the uplink bearer is a bidirectional bearer, the downlink bearer and the uplink bearer may be the same.

The uplink bearer may be alternatively a new bearer. For example, the downlink bearer is a unidirectional bearer, or uplink data and downlink data need to be transmitted on different bearers. The UE may send a bearer setup request to the AN CP function entity, to trigger the AN CP function entity to set up an uplink bearer. The uplink bearer and the downlink bearer have a same QoS attribute or corresponding QoS attributes.

The UE maps a first uplink IP flow to the first uplink data flow through non-access stratum (Non-access stratum, NAS for short) mapping. Further, the UE maps the first uplink data flow to the uplink bearer through access stratum (Access Stratum, AS for short) mapping.

211. The UE sends the first uplink data flow to the AN UP function entity by using the uplink bearer. The AN UP function entity receives the first uplink data flow by using the downlink bearer.

212. The AN UP function entity demaps the first uplink data flow received from the downlink bearer. The AN UP function entity may add a corresponding flow priority indicator (FPI) to a data packet header of the first uplink data flow. The AN UP function entity may further add the flow ID to the data packet header of the first uplink data flow. The AN UP function entity transmits the first uplink data flow to the CN UP function entity in a flow manner.

213. The CN UP function entity sends first uplink data in the received first uplink data flow to the data network in a form of an IP data packet.

It should be noted that steps indicated by dashed lines in FIG. 2 are optional. Certainly, steps indicated by solid lines may also be optional.

In the embodiment shown in FIG. 2, a flow-based data transmission mode is used inside a core network and on an interface between the core network and an access network, and QoS control information is transferred by using a user plane. A bearer-based data transmission mode is used in the access network (including an air interface), and the QoS control information is transferred by using a control plane.

Figure 3A:
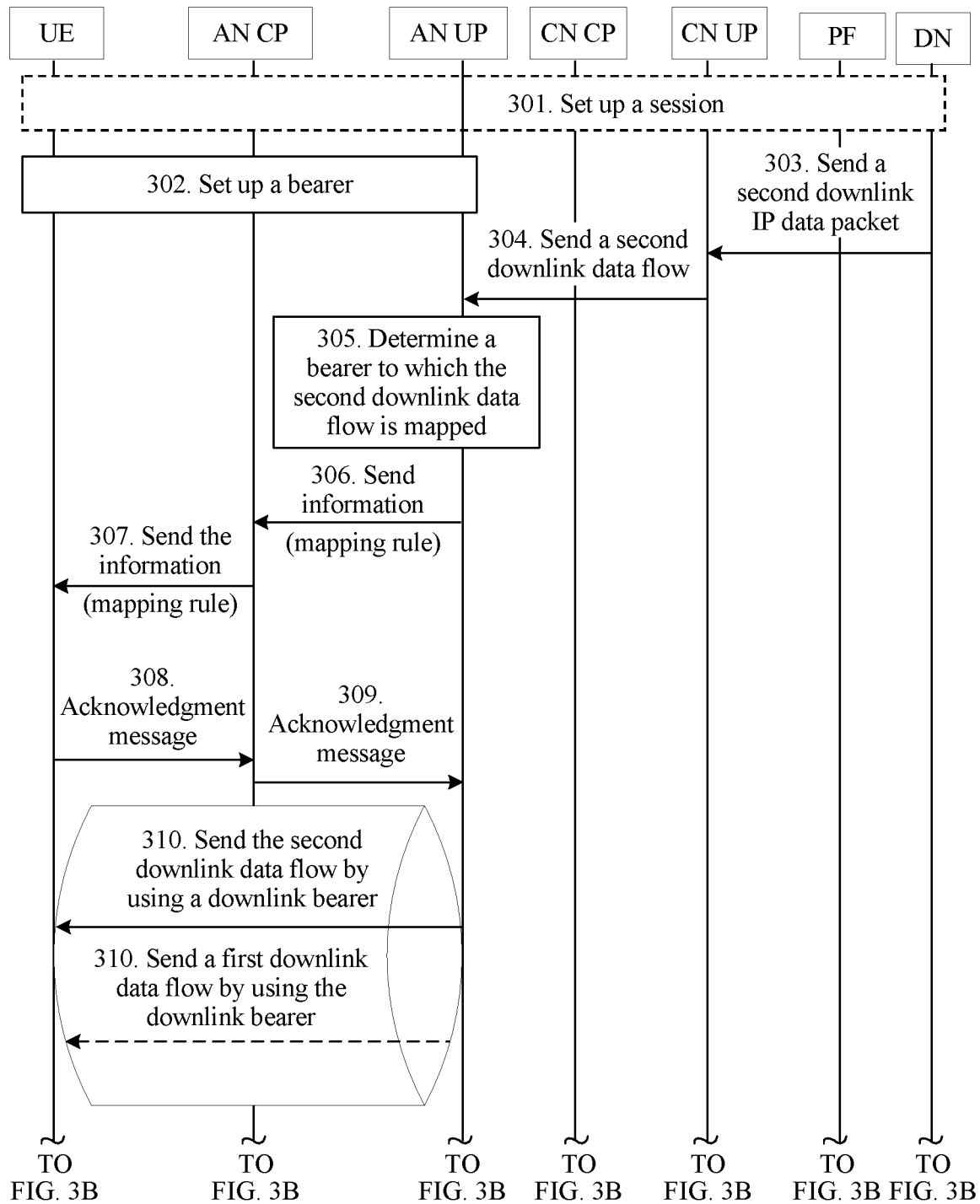
FIG. 3A and FIG. 3B are a schematic interaction diagram of a communication method according to another embodiment of this patent application.
Figure 3B:
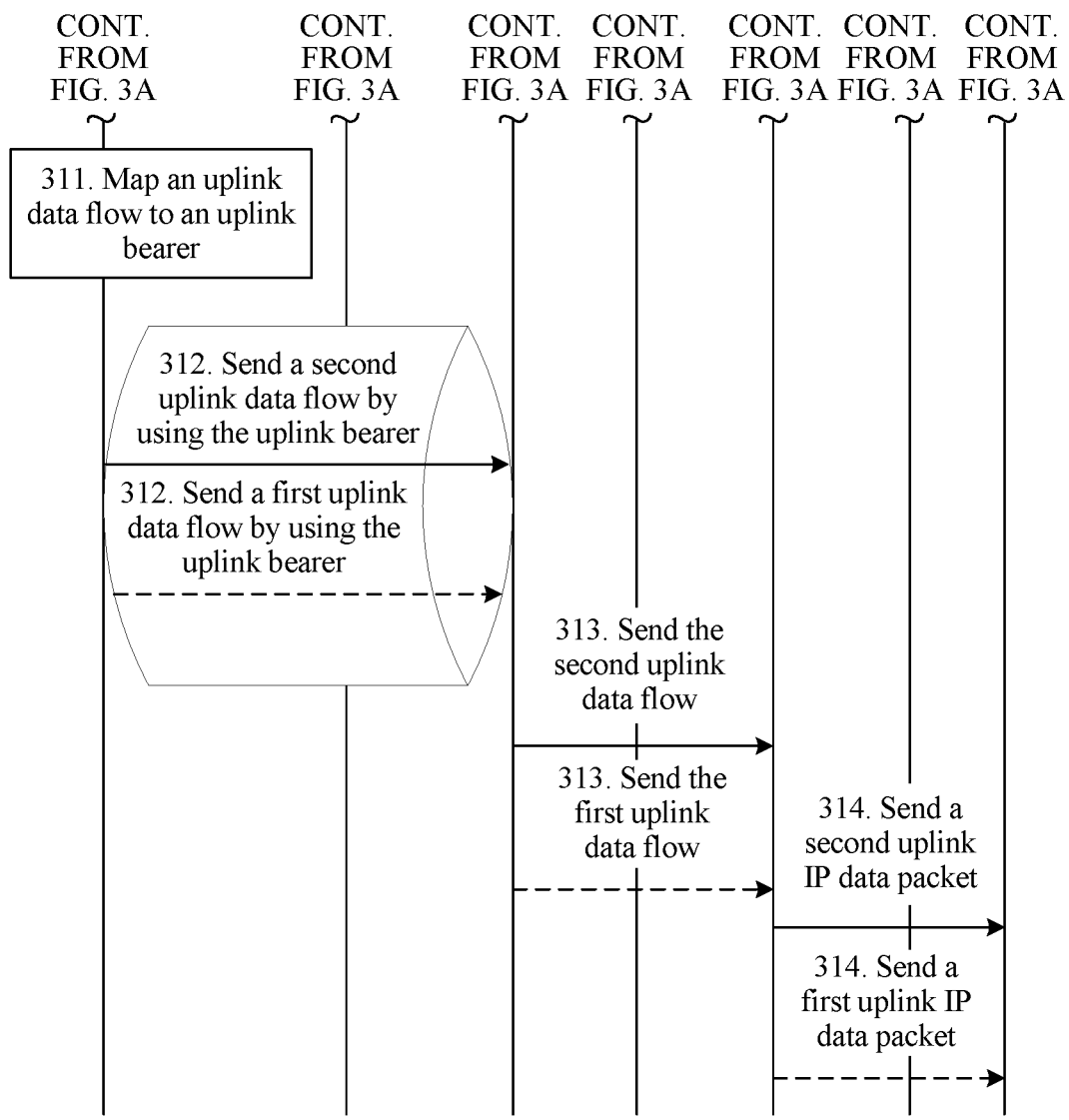

FIG. 3A and FIG. 3B are a schematic interaction diagram of a communication method according to another embodiment of this patent application. As shown in FIG. 3A and FIG. 3B, the method includes the following steps.

Step 301 is basically the same as step 201. For details, refer to step 201. The details are not described again.

302. Set up a bearer between the UE and an AN UP function entity. The bearer may be a default bearer. To be specific, the bearer does not need to be triggered by a data service. Setup of the bearer may be alternatively triggered by transmission of a first downlink data flow. In this case, for a bearer setup process, refer to the description in the embodiment shown in FIG. 2. The bearer may be unidirectional. For example, the bearer is an uplink bearer or a downlink bearer. The bearer may be alternatively bidirectional, and has both an uplink transmission function and a downlink transmission function. For example, the bearer integrates an uplink bearer and a downlink bearer.

303. The data network sends a second downlink IP data packet to the CN UP function entity. The CN UP function entity receives the second downlink IP data packet. An IP data packet may be transmitted in a form of an IP flow. Specifically, the second downlink IP data packet may be a second downlink IP flow.

304. The CN UP function entity processes the second downlink IP flow, and maps the second downlink IP flow to a second downlink data flow. The CN UP function entity sends the second downlink data flow to the AN UP function entity. The AN UP function entity receives the second downlink data flow. Specifically, the CN UP function entity sends the second downlink data flow to the AN UP function entity in a form of a flow.

The second downlink data flow is corresponding to one FPI denoted as FPI 2. Optionally, the CN UP function entity may further allocate a flow identifier (ID) denoted as Flow ID_2 to the second downlink data flow. The CN UP function entity adds data flow information to a data packet header of the second downlink data flow. The data flow information may include the FPI and the flow identifier. Optionally, the CN UP function entity may further add an RQI to the data packet header of the second downlink data flow. In this way, the AN UP function entity can know that a corresponding uplink data flow may be transmitted based on a QoS attribute of the second downlink data flow.

The second downlink IP flow may be mapped to the second downlink data flow in a template-based filtering manner. For details, refer to the foregoing description.

305. After receiving the second downlink data flow, the AN UP function entity checks whether there is a bearer available for mapping. For example, whether there is a bearer available for mapping may be checked based on the QoS attribute of the second downlink data flow. The AN UP function entity confirms that the second downlink data flow can be mapped to a downlink bearer. The downlink bearer may be the bearer set up in step 302. If it is previously determined that the first downlink data flow is mapped to the downlink bearer, both the first downlink data flow and the second downlink data flow can be mapped to the downlink bearer.

306. The AN UP function entity sends information to the AN CP function entity, where the information includes a mapping rule between a data flow and a bearer.

The mapping rule between a data flow and a bearer may be in a plurality of forms. For example, a mapping relationship between the second downlink data flow and the downlink bearer may specifically include a correspondence between an identifier ID of the second downlink data flow and an ID of the downlink bearer. Alternatively, the mapping relationship between the second downlink data flow and the downlink bearer includes a correspondence between a quality of service QoS attribute of the first downlink data flow and an ID of the downlink bearer. The mapping rule between a data flow and a bearer may further directly include a mapping relationship between an uplink data flow and an uplink bearer, and may specifically include a correspondence between an identifier ID of the uplink data flow and an ID of the uplink bearer or a correspondence between a quality of service QoS attribute of the uplink data flow and an ID of the uplink bearer.

307. The AN CP function entity sends the information to the UE, where the information includes the mapping rule between a data flow and a bearer. The UE receives the message. The message may be sent in a form of radio resource control (Radio Resource Control, RRC) signaling. The UE receives the information. The mapping rule between a data flow and a bearer is used by the UE to determine mapping from the data flow to the bearer when the UE sends uplink data. If the AN CP function entity previously sends a message including a mapping rule between a data flow and a bearer to the UE, the message in step 307 may be an update message, and only the mapping relationship between the second downlink data flow and the downlink bearer needs to be updated. Certainly, the message may be alternatively a separate message.

308. The UE sends an acknowledgment message to the AN CP function entity, to confirm that the UE has received the message including the mapping rule between a data flow and a bearer. The AN CP function entity receives the acknowledgment message.

309. The AN CP function entity sends the acknowledgment message to the AN UP function entity. The AN UP function entity receives the acknowledgment message.

310. The AN UP function entity maps the second downlink data flow to the downlink bearer, and sends the second downlink data flow to the UE by using the downlink bearer. The second downlink data flow transmitted on the downlink bearer does not need to include the RQI or the FPI. If the AN UP function entity also needs to transmit another downlink data flow (for example, the first downlink data flow) and the another downlink data flow can be mapped to the downlink bearer, the AN UP function entity also maps the another downlink data flow to the downlink bearer, and sends the another downlink data flow by using the downlink bearer. If two or more downlink data flows are mapped to the downlink bearer, data in the downlink data flows transmitted on the downlink bearer needs to include information about respective flow IDs.

311. When the UE needs to send a second uplink data flow to an access network device, the UE maps the second uplink data flow to an uplink bearer. The uplink bearer is determined based on the mapping rule.

The mapping rule between a data flow and a bearer includes the mapping relationship between the second downlink data flow and the downlink bearer. That the uplink bearer is determined based on the mapping rule includes: If the second uplink data flow is corresponding to the second downlink data flow, the uplink bearer is determined based on the downlink bearer.

In one case, the mapping relationship between the second downlink data flow and the downlink bearer includes the correspondence between the identifier ID of the second downlink data flow and the ID of the downlink bearer. That the second uplink data flow is corresponding to the second downlink data flow includes: An ID of the second uplink data flow is the same as the ID of the second downlink data flow, or the second uplink data flow and the second downlink data flow belong to a same service flow, or the second uplink data flow and the second downlink data flow belong to a same session flow.

That the uplink bearer is determined based on the downlink bearer includes: The downlink bearer and the uplink bearer are a same bearer, or a quality of service QoS attribute of the downlink bearer is the same as a QoS attribute of the uplink bearer.

In another case, the mapping relationship between the second downlink data flow and the downlink bearer includes the correspondence between the quality of service QoS attribute of the second downlink data flow and the ID of the downlink bearer. That the second uplink data flow is corresponding to the second downlink data flow includes: A QoS attribute of the second uplink data flow is the same as the QoS attribute of the second downlink data flow, or the second uplink data flow and the second downlink data flow belong to a same service flow, or the second uplink data flow and the second downlink data flow belong to a same session flow. That the uplink bearer is determined based on the downlink bearer includes: The uplink bearer and the downlink bearer are a same bearer, or a QoS attribute of the uplink bearer is the same as a QoS attribute of the downlink bearer.

It should be noted that the uplink bearer and the downlink bearer may be the same or different. If the uplink bearer is a bidirectional bearer, the downlink bearer and the uplink bearer may be the same.

The uplink bearer may be alternatively a new bearer. For example, the downlink bearer is a unidirectional bearer, or uplink and downlink data need to be transmitted on different bearers. The UE may send a bearer setup request to the AN CP function entity, to trigger the AN CP function entity to set up an uplink bearer. The uplink bearer and the downlink bearer have a same QoS attribute or corresponding QoS attributes.

Optionally, if the UE further needs to send another uplink data flow (for example, a first uplink data flow), the another uplink data flow may also be mapped to the uplink bearer based on the mapping rule between a data flow and a bearer. The UE also maps the another uplink data flow to the uplink bearer.

312. The UE sends the second uplink data flow to the AN UP function entity by using the uplink bearer, and the AN UP function entity receives the second uplink data flow. Optionally, the UE may further send a first uplink data flow to the AN UP function entity by using the uplink bearer, and the AN UP function entity receives the first uplink data flow.

313. The AN UP function entity demaps an uplink data flow received from the downlink bearer, and the AN UP function entity may add a corresponding flow priority indicator (FPI) to a data packet header of the uplink data flow. The AN UP function entity may further add a flow ID to the data packet header of the uplink data flow. The AN UP function entity transmits the second uplink data flow to the CN UP function entity in a flow manner. The CN UP function entity receives the second uplink data flow. Optionally, the AN UP function entity transmits the first uplink data flow to the CN UP function entity in the flow manner. The CN UP function entity receives the first uplink data flow.

314. The CN UP function entity sends uplink data in a received uplink data flow to the data network by using an IP data packet. Specifically, the CN UP function entity sends uplink data in the received second uplink data flow to the data network by using an IP data packet. Optionally, the CN UP function entity sends uplink data in the received first uplink data flow to the data network by using an IP data packet.

In the embodiments shown in FIG. 2, FIG. 3A, and FIG. 3B, the mapping rule between a bearer and a data flow is sent to the UE by using signaling, and the UE determines, based on the mapping rule, a bearer used to transmit an uplink data flow. This can reduce data plane transmission overheads and air interface overheads, thereby greatly reducing load of a data packet header and effectively improving efficiency of valid data transmission over an air interface.

Figure 4A:
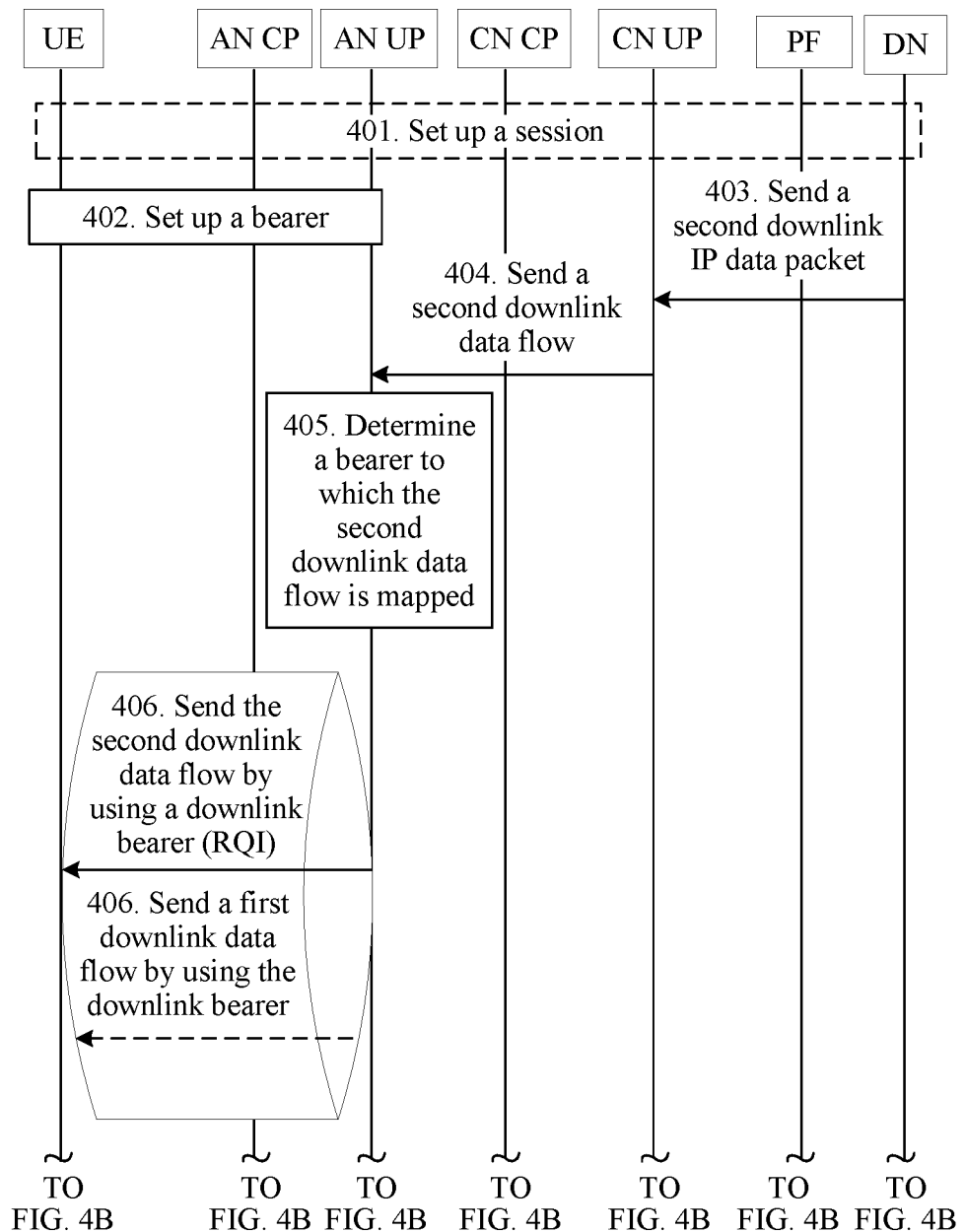
FIG. 4A and FIG. 4B are a schematic interaction diagram of a communication method according to another embodiment of this patent application.
Figure 4B:
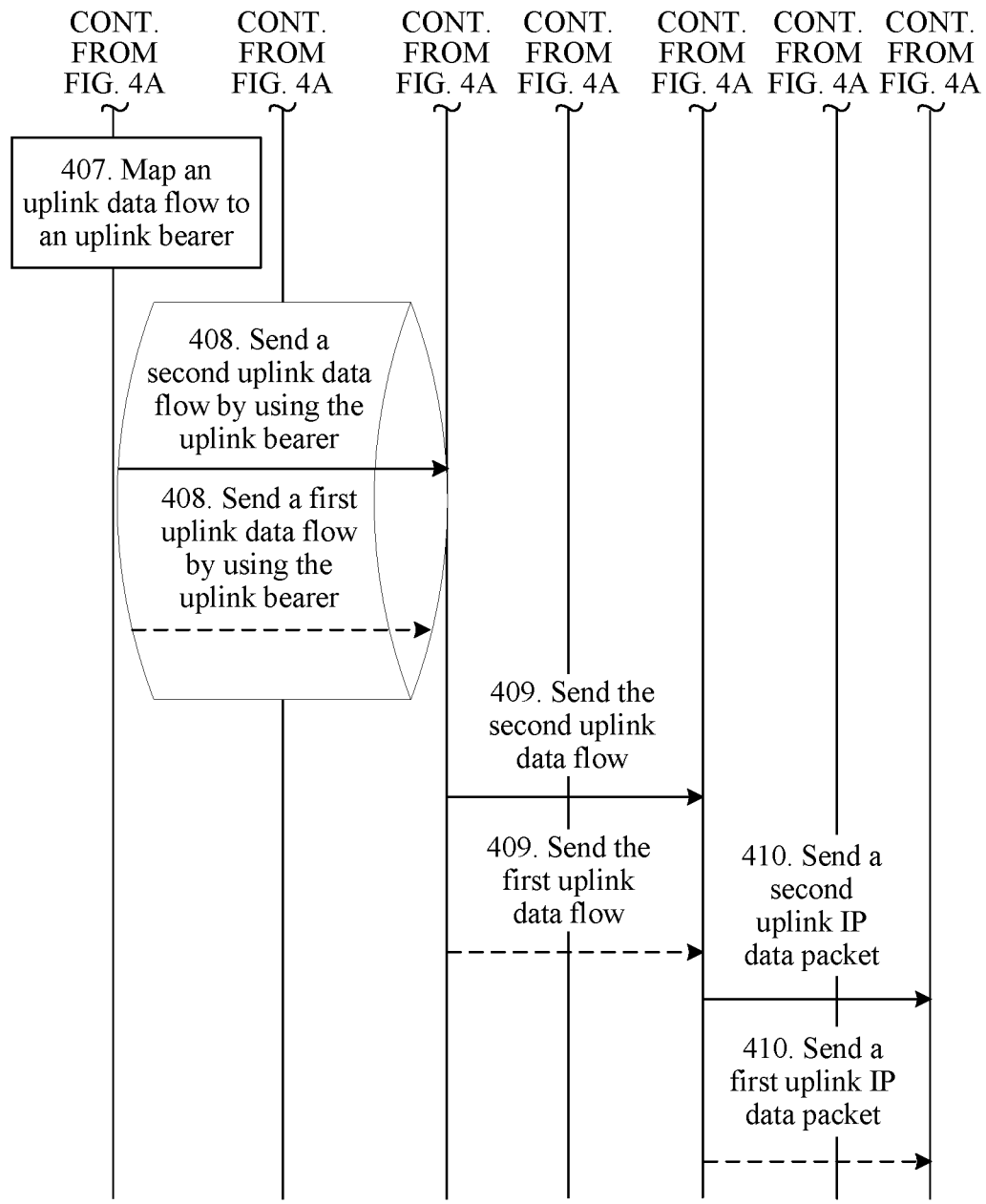

FIG. 4A and FIG. 4B are a schematic interaction diagram of a communication method according to another embodiment of this patent application. As shown in FIG. 4A and FIG. 4B, the method includes the following steps.

Steps 401 to 404 are basically the same as steps 310 to 304. For details, refer to steps 301 to 304. The details are not described again.

405. After receiving the second downlink data flow, the AN UP function entity determines to use a reflective QoS manner to transmit data.

The AN UP function entity may determine to use the reflective QoS manner. The AN UP function entity may alternatively request a downlink data flow transmission mode from the AN CP function entity. The AN CP function entity notifies the AN UP function entity after determining to use the reflective QoS manner.

The AN UP function entity checks whether there is a bearer available for mapping, for example, performing checking based on the QoS attribute of the second downlink data flow, and confirms that the second downlink data flow can be mapped to a downlink bearer. If it is previously determined that the first downlink data flow is mapped to the downlink bearer, both the first downlink data flow and the second downlink data flow can be mapped to the downlink bearer.

406. The AN UP function entity maps the second downlink data flow to the downlink bearer, and sends a data packet in the second downlink data flow to the UE by using the downlink bearer. Data in the second downlink data flow includes an RQI. If the AN UP function entity further needs to transmit the first downlink data flow, the AN UP function entity also maps the first downlink data flow to the downlink bearer. Correspondingly, data in the first downlink data flow includes an RQI. If two or more downlink data flows are mapped to the downlink bearer, data in the downlink data flows transmitted on the downlink bearer needs to include information about respective flow IDs.

407. When the UE needs to send a second uplink data flow corresponding to the second downlink data flow to an access network device, the UE sends the second uplink data flow by using an uplink bearer. The data in the second downlink data flow includes the RQI, and the second uplink data flow is corresponding to the second downlink data flow. In this case, the uplink bearer is determined based on the downlink bearer.

That the uplink data flow is corresponding to the downlink data flow includes: An ID of the uplink data flow is the same as an ID of the downlink data flow, or the uplink data flow and the downlink data flow belong to a same service flow, or the uplink data flow and the downlink data flow belong to a same session flow.

That the uplink bearer is determined based on the downlink bearer includes: The uplink bearer and the downlink bearer are a same bearer, or a quality of service QoS attribute of the uplink bearer is the same as a QoS attribute of the downlink bearer.

If another uplink data flow, for example, the first uplink data flow, is further transmitted on the uplink bearer, the data flows transmitted on the uplink bearer need to include information about respective data flow IDs.

Steps 408 to 410 are basically the same as steps 312 to 314. For details, refer to steps 312 to 314. The details are not described again.

In the embodiment shown in the figure, step 402 is performed before step 404. To be specific, when the AN UP function entity receives a downlink data flow, there is already a proper bearer available for mapping. Certainly, if there is no proper bearer available for mapping before step 405, the AN UP function entity may send a bearer setup request to the AN CP function entity, to set up a proper bearer. For details, refer to steps 204, 205, and 208 in the embodiment shown in FIG. 2.

In the embodiment shown in FIG. 4A and FIG. 4B, a mapping rule between a bearer and a data flow is sent to the UE in the reflective QoS manner, and the UE determines, based on an RQI, a bearer used to transmit an uplink data flow. This can reduce signaling plane transmission overheads and reduce a latency.

In this patent application, the access network device may determine to notify the UE in the signaling manner (in the embodiment shown in FIG. 2 or FIG. 3A and FIG. 3B) or in the reflective QoS manner (in the embodiment shown in FIG. 4A and FIG. 4B). For example, some network devices support only a specific service type, for example, a machine type communications (Machine Type Communication) service or a mobile broadband (mobile broadband, MBB) service. The access network device may select a proper manner based on a service feature of a service type supported by the access network device. For example, the machine type communications service has infrequent small packets, and the access network device may use the reflective QoS manner for this service type. For a mobile broadband service based on big data, the signaling manner may be used even if a core network has already used the reflective QoS manner. In a scenario in which one access network device supports a plurality of service types, the access network device may also select a proper manner based on a service feature of a service type. In this case, when the UE receives two different mapping rules, a conflict avoidance mechanism may be used. For example, signaling has a higher priority than the reflective QoS. Alternatively, the reflective QoS has a higher priority than signaling. Alternatively, a latest received mapping rule may prevail, regardless of whether the mapping rule is obtained in the signaling manner or in the reflective QoS manner.

Similarly, the access network device may alternatively select a proper manner based on a QoS attribute of a data flow. For example, if a data flow that is received by the access network device and that is sent by a core network device includes an RQI, in other words, the core network uses the reflective QoS method, the access network device uses the reflective QoS manner; or if a data flow does not include an RQI, the access network device may use the signaling manner. For another example, the signaling manner may be used for a GBR data flow; and the reflective QoS may be used for a non-GBR data flow.

In this patent application, QoS control performed by a network on data includes two layers of QoS mapping: NAS layer mapping and AS layer mapping. The NAS layer mapping may be mapping from an IP flow to a data flow (for example, a QoS flow). When downlink transmission is performed, the operation is completed by the CN UP function entity. When uplink transmission is performed, the operation is completed by the UE. The AS layer mapping may be mapping from a data flow to a bearer. When downlink transmission is performed, the operation is completed by the AN UP. When uplink transmission is performed, the operation is completed by the UE.

This patent application may be applicable to a QoS architecture in which an access network and a core network each have an independent QoS control function. The access network can determine the QoS control manner to a greater extent, to achieve a balance between meeting of a service QoS requirement and improvement of network resource utilization.

The foregoing describes the methods in the embodiments of the present invention in detail with reference to FIG. 1 to FIG. 4B. The following describes user equipment and a network device in the embodiments of the present invention in detail with reference to FIG. 5 to FIG. 8.

Figure 5:
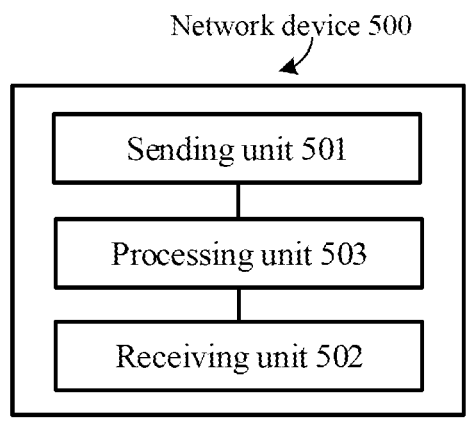
FIG. 5 is a schematic structural diagram of a network device according to an embodiment of the present invention.

FIG. 5 is a schematic block diagram of a network device 500 according to an embodiment of the present invention. It should be understood that the network device 5 can perform the steps performed by the access network device in the methods in FIG. 2 to FIG. 4B. To avoid repetition, details are not described herein again. The network device 500 may be an access network device, and may include an AN CP function entity and/or an AN UP function entity.

A sending unit 501 is configured to perform a sending step performed by the AN CP function entity and/or the AN UP function entity in FIG. 2 to FIG. 4B. For example, when the network device 500 includes the AN CP function entity, the sending unit 501 may be configured to perform a sending step performed by the AN CP function entity in FIG. 2 to FIG. 4B. The sending step may specifically include sending information and/or sending a bearer setup response. When the network device 500 includes the AN UP function entity, the sending unit 501 may be configured to perform a sending step performed by the AN UP function entity in FIG. 2 to FIG. 4B. The sending step may specifically include: sending a bearer setup request, sending information, sending data (for example, a first downlink data flow, a second downlink data flow, a first uplink data flow, and/or a second uplink data flow), and/or the like.

A receiving unit 502 is configured to perform a receiving step performed by the AN CP function entity and/or the AN UP function entity in FIG. 2 to FIG. 4B. For example, when the network device 500 includes the AN CP function entity, the receiving unit 502 may be configured to perform a receiving step performed by the AN CP function entity in FIG. 2 to FIG. 4B. The receiving step may specifically include: receiving a bearer setup request, receiving an acknowledgment message sent by UE, and/or receiving information sent by the AN UP. When the network device 500 includes the AN UP function entity, the receiving unit 502 may be configured to perform a receiving step performed by the AN UP function entity in FIG. 2 to FIG. 4B. The receiving step may specifically include: receiving a bearer setup response, receiving an acknowledgment message, receiving data (for example, a first downlink data flow, a second downlink data flow, a first uplink data flow, and/or a second uplink data flow), and/or the like.

A processing unit 503 is configured to perform a step other than the sending step and the receiving step that are performed by the AN CP function entity and/or the AN UP function entity in FIG. 2 to FIG. 4B, for example, confirming a bearer to which the second downlink data flow is mapped.

It should be understood that an action performed by the processing unit 503 may be implemented by a processor, and an action performed by the sending unit 501 and an action performed by the receiving unit 502 may be implemented by a transceiver under control of the processor.

Figure 6:
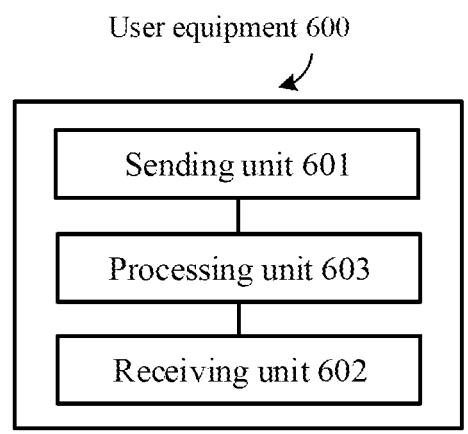
FIG. 6 is a schematic structural diagram of user equipment according to an embodiment of the present invention.

FIG. 6 is a schematic block diagram of user equipment 600 according to an embodiment of the present invention. It should be understood that the user equipment 600 can perform the steps performed by the UE in the methods in FIG. 2 to FIG. 4B. To avoid repetition, details are not described herein again. The user equipment 600 includes:

a sending unit 601, configured to perform a sending step performed by the UE in FIG. 2 to FIG. 4B, for example, sending an acknowledgment message and/or sending data (for example, a first uplink data flow and/or a second uplink data flow);

a receiving unit 602, configured to perform a receiving step performed by the UE in FIG. 2 to FIG. 4B, for example, receiving information and/or receiving data (for example, a first downlink data flow and/or a second downlink data flow); and a processing unit 603, configured to perform a step other than the sending step and the receiving step that are performed by the UE in FIG. 2 to FIG. 4B, for example, mapping data to a bearer (for example, mapping an uplink data flow to an uplink bearer).

It should be understood that an action performed by the processing unit 603 may be implemented by a processor, and an action performed by the sending unit 601 and an action performed by the receiving unit 602 may be implemented by a transceiver under control of the processor.

Figure 7:
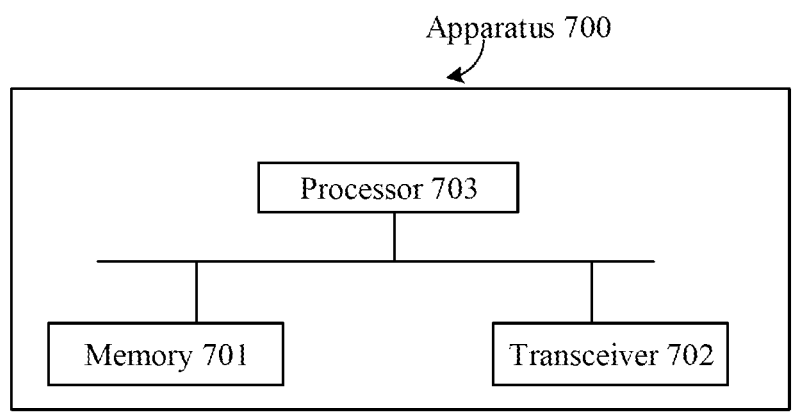
FIG. 7 is a schematic structural diagram of a network device according to another embodiment of the present invention.

FIG. 7 is a schematic structural diagram of an apparatus according to an embodiment of the present invention. The apparatus 700 can perform the steps performed by the AN CP function entity and/or the AN UP function entity in the methods in FIG. 2 to FIG. 4B. The apparatus 700 includes a memory 701, a transceiver 702, and a processor 703. The memory 701 is configured to store a program. The transceiver 702 is configured to communicate with another device, for example, UE. The processor 703 is connected to the memory 701 and the transceiver 702, and is configured to execute the program in the memory 701. When the program in the memory 701 is executed, the apparatus 700 performs the actions performed by the AN CP function entity and/or the AN UP function entity in FIG. 2 to FIG. 4B.

Figure 8:
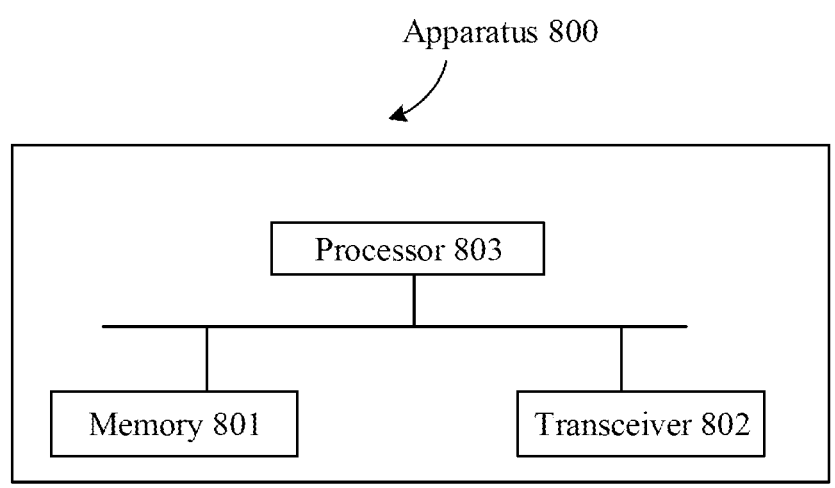
FIG. 8 is a schematic structural diagram of user equipment according to another embodiment of the present invention.

FIG. 8 is a schematic structural diagram of an apparatus according to an embodiment of the present invention. The apparatus 800 may perform the steps performed by the UE in the methods in FIG. 2 to FIG. 4B. The apparatus 800 includes a memory 801, a transceiver 802, and a processor 803. The memory 801 is configured to store a program. The transceiver 802 is configured to communicate with another device, for example, an AN CP function entity and/or an AN UP function entity. The processor 803 is connected to the memory 801 and the transceiver 802, and is configured to execute the program in the memory 801. When the program in the memory 801 is executed, the apparatus 8 performs the actions performed by the UE in FIG. 2 to FIG. 4B.

It should be understood that in the embodiments of the present invention, the processor of the foregoing apparatus may be a central processing unit (Central Processing Unit, CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

It may be clearly understood by a person skilled in the art that, for the purpose of convenient and brief description, for a specific working process of the foregoing system, apparatus, and unit, refer to a corresponding process in the foregoing method embodiments. Details are not described herein again.

In the several embodiments provided in this application, it should be understood that the described system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces, indirect couplings or communication connections between the apparatuses or units, or electrical connections, mechanical connections, or connections in other forms.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

All or some of the foregoing embodiments may be implemented by using software, hardware, firmware, or any combination thereof. When hardware is used to implement the embodiments, all or some of the embodiments may be implemented in a form of a processor or an integrated logic circuit. When software is used to implement the embodiments, all or some of the embodiments may be implemented in a form of a computer program product. The computer program product includes one or more computer instructions. When the computer program instruction is loaded and executed on a computer, all or some of the procedures or functions according to the embodiments of the present invention are generated. The computer may be a general-purpose computer, a special-purpose computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

The foregoing descriptions are merely specific implementations of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A wireless communication method, comprising:
    receiving, by user equipment, a first downlink data flow from a downlink bearer from an access network device, wherein the first downlink data flow is based on a second downlink data flow received by the access network device from a core network device, the second downlink data flow comprises a reflective quality of service (QoS) indication that indicates whether data transmission is performed in a reflective QoS manner, but the first downlink data flow does not comprise the reflective QoS indication;
    receiving, by the user equipment, information indicating a mapping between an uplink Internet Protocol (IP) flow and an uplink data flow;
    mapping, by the user equipment, the uplink IP flow to the uplink data flow through a non-access stratum (NAS) mapping;
    mapping, by the user equipment, the uplink data flow to an uplink bearer through an access stratum (AS) mapping according to a mapping rule, wherein the mapping rule is obtained in a signaling manner or obtained based on the reflective QoS indication; and
    sending, by the user equipment, the uplink data flow by using the uplink bearer to the access network device, wherein the uplink data flow is corresponding to the first downlink data flow, the uplink bearer is determined based on the downlink bearer, and the uplink bearer and the downlink bearer are a same bearer,
    wherein the uplink data flow is corresponding to the first downlink data flow comprises the uplink data flow and the first downlink data flow belong to a same protocol data unit (PDU) session flow.

2. The wireless communication method according to claim 1, further comprising:
    obtaining, by the user equipment, a second mapping rule in a signaling manner; and
    applying, by the user equipment, a latest mapping rule regardless of whether the latest mapping rule is obtained in the signaling manner or obtained based on the reflective QoS indication.

3. The wireless communication method according to claim 2, wherein
    obtaining, by the user equipment, the second mapping rule, comprises:
    receiving, by the user equipment, information including the second mapping rule between a dataflow and a bearer in a form of radio resource control (RRC) signaling.

4. The wireless communication method according to claim 1, wherein:
    the reflective QoS indication is determined by the access network device.

5. The wireless communication method according to claim 1, wherein:
receiving, by the user equipment, the first downlink data flow from the downlink bearer from the access network device comprises:
receiving, by the user equipment, downlink data packets in a form of a flow from the downlink bearer.

6. A wireless communication method, comprising:
receiving, by an access network device, a first downlink data flow from a core network device, wherein the first downlink data flow received from the core network device comprises a reflective quality of service (QoS) indication that indicates whether data transmission is performed in a reflective QoS manner;
determining, by the access network device, to use the reflective QoS manner to transmit data;
mapping, by the access network device, the first downlink data flow to a downlink bearer;
sending, by the access network device, a second downlink data flow in the downlink bearer to user equipment, wherein the second downlink data flow does not comprise the reflective QoS indication; and
receiving, by the access network device, an uplink data flow in an uplink bearer from the user equipment, wherein in response to information indicating a mapping between an uplink Internet Protocol (IP) flow and the uplink data flow, the uplink IP flow is mapped to the uplink data flow through a non-access stratum (NAS) mapping, and the uplink data flow is mapped to the uplink bearer through an access stratum (AS) mapping according to a mapping rule, wherein the mapping rule is indicated in a signaling manner or determined based on the reflective QoS indication,
wherein the uplink data flow is corresponding to the second downlink data flow, and the uplink bearer and the downlink bearer are a same bearer,
wherein the uplink data flow is corresponding to the second downlink data flow comprises
the uplink data flow and the second downlink data flow belong to a same protocol data unit (PDU) session flow.

7. The wireless communication method according to claim 6, further comprising:
sending, by the access network device, a second mapping rule in a signaling manner to the user equipment; and
receiving, by the access network device, the uplink data flow based on the latest mapping rule regardless of whether the latest mapping rule is obtained in the signaling manner or based on the reflective QoS indication.

8. The wireless communication method according to claim 7, wherein sending, by the access network device, the second mapping rule in the signaling manner to the user equipment, comprises:
sending, by the access network device, information including the second mapping rule between a data flow and a bearer in a form of radio resource control (RRC) signaling.

9. The wireless communication method according to claim 6, wherein sending, by the access network device, the second downlink data flow in the downlink bearer to the user equipment, comprises:
sending, by the access network device, downlink data packets in a form of a flow in the downlink bearer.

10. An apparatus, comprising:
at least one processor; and
a non-transitory computer-readable storage medium coupled to the at least one processor and storing programming instructions for execution by the at least one processor, wherein the programming instructions instruct the apparatus to perform operations comprising:
receiving a first downlink data flow from a downlink bearer from an access network device, wherein the first downlink data flow is based on a second downlink data flow received by the access network device from a core network device, wherein the second downlink data flow received by the access network device comprises a reflective quality of service (QoS) indication that indicates whether data transmission is performed in a reflective QoS manner, but the first downlink data flow does not comprise the reflective QoS indication;
receiving information indicating a mapping between an uplink Internet Protocol (IP) flow and an uplink data flow;
mapping the uplink IP flow to the uplink data flow through a non-access stratum (NAS) mapping;
mapping the uplink data flow to an uplink bearer through an access stratum (AS) mapping according to a mapping rule, wherein the mapping rule is obtained in a signaling manner or obtained based on the reflective QoS indication; and
sending the uplink data flow by using the uplink bearer to the access network device, wherein the uplink data flow is corresponding to the first downlink data flow, the uplink bearer is determined based on the downlink bearer, and the uplink bearer and the downlink bearer are a same bearer,
wherein the uplink data flow is corresponding to the first downlink data flow comprises the uplink data flow and the first downlink data flow belong to a same protocol data unit (PDU) session flow.

11. The apparatus according to claim 10, wherein the operations further comprise:
obtaining a second mapping rule in a signaling manner; and
applying a latest mapping rule regardless of whether the latest mapping rule is obtained in the signaling manner or obtained based on the reflective QoS indication.

12. The apparatus according to claim 11, wherein obtaining the second mapping rule, comprises:
receiving information including the second mapping rule between a dataflow and a bearer in a form of radio resource control (RRC) signaling.

13. The apparatus according to claim 10, wherein:
receiving the first downlink data flow from the downlink bearer from the access network device comprises:
receiving the first downlink data flow in a downlink QoS flow.

14. An apparatus, comprising:
at least one processor; and
a non-transitory computer-readable storage medium coupled to the at least one processor and storing programming instructions for execution by the at least one processor, wherein the programming instructions instruct the at least one processor to perform operations comprising:
receiving, by an access network device, a first downlink data flow from a core network device, wherein the first downlink data flow received from the core network device comprises a reflective quality of service (QoS) indication that indicates whether data transmission is performed in a reflective QoS manner;
determining, by the access network device, to use the reflective QoS manner to transmit data;

mapping, by the access network device, the first downlink data flow to a downlink bearer;

sending, by the access network device, a second downlink data flow in the downlink bearer to user equipment, wherein the second downlink data flow does not comprise the reflective QoS indication; and receiving, by the access network device, an uplink data flow in an uplink bearer from the user equipment, wherein in response to information indicating a mapping between an uplink Internet Protocol (IP) flow and the uplink data flow, the uplink IP flow is mapped to the uplink data flow through a non-access stratum (NAS) mapping, and the uplink data flow is mapped to the uplink bearer through an access stratum (AS) mapping according to a mapping rule, wherein the mapping rule is indicated in a signaling manner or determined based on the reflective QoS indication;

wherein the uplink data flow is corresponding to the second downlink data flow, and the uplink bearer and the downlink bearer are a same bearer, wherein the uplink data flow is corresponding to the second downlink data flow comprises the uplink data flow and the second downlink data flow belong to a same protocol data unit (PDU) session flow.

15. The apparatus according to claim 14, wherein the operations further comprise:

sending, by the access network device, a second mapping rule in a signaling manner to the user equipment; and receiving, by the access network device, the uplink data flow based on a latest mapping rule regardless of whether the latest mapping rule is obtained in the signaling manner or based on the reflective QoS indication.

16. The apparatus according to claim 15, wherein sending, by the access network device, the second mapping rule in the signaling manner to the user equipment, comprises:

sending, by the access network device, information including the second mapping rule between a dataflow and a bearer in a form of radio resource control (RRC) signaling.

17. The apparatus according to claim 14, wherein sending, by the access network device, the second downlink data flow from the downlink bearer to the user equipment, comprises:

sending, by the access network device, the second downlink data flow in a downlink QoS flow.

\* \* \* \* \*